(12) United States Patent
Kim et al.

(10) Patent No.: US 12,198,227 B2
(45) Date of Patent: Jan. 14, 2025

(54) METHOD AND APPARATUS FOR OUTPUTTING VIRTUAL SMOKE IMAGE

(71) Applicant: KT&G CORPORATION, Daejeon (KR)

(72) Inventors: Jae Hyun Kim, Daejeon (KR); Minseok Jeong, Daejeon (KR); Tae Young Chung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/280,405

(22) PCT Filed: Jun. 2, 2023

(86) PCT No.: PCT/KR2023/007568
§ 371 (c)(1),
(2) Date: Sep. 5, 2023

(87) PCT Pub. No.: WO2024/019315
PCT Pub. Date: Jan. 25, 2024

(65) Prior Publication Data
US 2024/0119642 A1  Apr. 11, 2024

(30) Foreign Application Priority Data
Jul. 19, 2022 (KR) .................. 10-2022-0088783

(51) Int. Cl.
*G06T 11/00* (2006.01)
*A24F 40/51* (2020.01)
(Continued)

(52) U.S. Cl.
CPC ............. *G06T 11/00* (2013.01); *A24F 40/51* (2020.01); *A24F 40/65* (2020.01); *G06F 3/011* (2013.01); *H04W 4/80* (2018.02)

(58) Field of Classification Search
CPC .......... A24F 40/51; A24F 40/00; A24F 40/65; A24F 40/50; A24F 47/00; G06F 3/011; G06F 3/03; G06T 11/00; H04W 4/80
(Continued)

(56) References Cited

U.S. PATENT DOCUMENTS

2007/0006889 A1\* 1/2007 Kobal ................. A24F 42/20
131/329
2019/0000147 A1\* 1/2019 Koc .................... A24F 40/65
(Continued)

FOREIGN PATENT DOCUMENTS

JP       2008-542833 A    11/2008
KR    10-2008-0014742 A    2/2008
(Continued)

OTHER PUBLICATIONS

International Search Report for PCT/KR2023/007568 dated Aug. 28, 2023 [PCT/ISA/210].
(Continued)

*Primary Examiner* — Jimmy H Nguyen
(74) *Attorney, Agent, or Firm* — Sughrue Mion, PLLC

(57) ABSTRACT

To output a virtual smoke image, an electronic device may receive a connection request from an aerosol generating device in a state of being paired with one or more external controllers, determine a controller type of the aerosol generating device, suspend pairing with a target external controller among the one or more external controllers when the determined controller type corresponds to a type of the target external controller, perform connection with the aerosol generating device, receive sensing information about a state of the aerosol generating device, generate a virtual smoke image based on the sensing information, and output the virtual smoke image through a display of the electronic device.

11 Claims, 6 Drawing Sheets

(51) Int. Cl.
  *A24F 40/65* (2020.01)
  *G06F 3/01* (2006.01)
  *H04W 4/80* (2018.01)
(58) Field of Classification Search
  USPC ..................................................... 345/156, 8
  See application file for complete search history.

(56) References Cited

U.S. PATENT DOCUMENTS

2019/0295304 A1* 9/2019 Janardhan ............. G06T 13/205
2022/0248772 A1* 8/2022 Kim ........................ G06F 3/165
2023/0248074 A1* 8/2023 Moloney ................. A24F 40/50
                                                            131/328

FOREIGN PATENT DOCUMENTS

| KR | 2010-0115679 A | 10/2010 |
| KR | 10-2018-0034941 A | 4/2018 |
| KR | 10-2018-0094068 A | 8/2018 |
| KR | 10-1949373 B1 | 2/2019 |
| WO | 2014/199233 A2 | 12/2014 |
| WO | 2016/088185 A1 | 6/2016 |
| WO | 2021/071208 A1 | 4/2021 |
| WO | 2021/260343 A1 | 12/2021 |

OTHER PUBLICATIONS

Japanese Office Action dated Sep. 17, 2024 in Application No. 2023-553080.
Korean Office Action dated Sep. 19, 2024 in Application No. 10-2022-0088783.

* cited by examiner

METHOD AND APPARATUS FOR OUTPUTTING VIRTUAL SMOKE IMAGE

CROSS REFERENCE TO RELATED APPLICATIONS

This application is a National Stage of International Application No. PCT/KR2023/007568 filed Jun. 2, 2023, claiming priority based on Korean Patent Application No. 10-2022-0088783 filed Jul. 19, 2022.

TECHNICAL FIELD

The following embodiments relate to a technique for implementing virtual smoke in an electronic device.

BACKGROUND ART

Recently, virtual reality (VR), augmented reality (AR), and mixed reality (MR) technologies utilizing computer graphics technology have been developed. At this time, VR technology refers to a technology that uses a computer to build a virtual space that does not exist in the real world and then makes a user feel the virtual space like reality, and AR or MR technology refers to a technology that adds computer-generated information to the real world, that is, a technology that combines the real world and a virtual world to allow real-time interaction with a user.

AR and MR technologies are utilized in conjunction with technologies in various fields. Even in the field of electronic cigarettes, demand for devices that implement VR or AR services is increasing, and a variety of research is being conducted accordingly.

DISCLOSURE OF THE INVENTION

Technical Goals

An embodiment may provide a method of outputting a virtual smoke image, performed by an electronic device.

An embodiment may provide an electronic device for performing a method of outputting a virtual smoke image.

Technical Solutions

According to an embodiment, a method of outputting a virtual smoke image, performed by an electronic device, includes receiving a connection request from an aerosol generating device in a state of being paired with one or more external controllers, determining a controller type of the aerosol generating device, suspending pairing with a target external controller among the one or more external controllers when the determined controller type corresponds to a type of the target external controller and performing connection with the aerosol generating device, receiving sensing information about a state of the aerosol generating device, generating a virtual smoke image based on the sensing information, and outputting the virtual smoke image through a display of the electronic device.

The outputting of the virtual smoke image through the display of the electronic device may include outputting the virtual smoke image to be superimposed on a reference image for an existing application being executed by the electronic device.

The generating of the virtual smoke image based on the sensing information may include determining a property of virtual smoke based on the sensing information, wherein the property of virtual smoke may include at least one of a size, a shape, and a duration of the virtual smoke, and generating the virtual smoke image based on the property of the virtual smoke.

The outputting of the virtual smoke image through the display of the electronic device may include determining an expiration timepoint at which a user of the aerosol generating device starts expiration based on the sensing information, and outputting the virtual smoke image at the expiration timepoint.

The determining of the expiration timepoint at which the user of the aerosol generating device starts expiration based on the sensing information may include determining the expiration timepoint based on a first time when a distance between one side of the aerosol generating device and a body part of the user, detected by the aerosol generating device, reaches within a first threshold value and a second time when the distance between the one side of the aerosol generating device and the body part of the user exceeds a second threshold value after the first time.

The determining of the expiration timepoint at which the user of the aerosol generating device starts expiration based on the sensing information may include determining the expiration timepoint based on a change in capacitance of the aerosol generating device.

The determining of the expiration timepoint based on the change in capacitance of the aerosol generating device may include determining the expiration timepoint based on a first time when a value of the capacitance of the aerosol generating device, sensed by the aerosol generating device, reaches within a first threshold value and a second time when the value of the capacitance of the aerosol generating device exceeds a second threshold value after the first time.

The connection request may be received through a dongle connected to the electronic device from the aerosol generating device establishing a wireless communication channel with the dongle.

The connection request may be received from the aerosol generating device directly establishing a wireless communication channel with the electronic device.

According to an embodiment, an electronic apparatus for performing a method of outputting a virtual smoke image includes a display, a memory configured to store a program for outputting a virtual smoke image, and a processor configured to execute the program, wherein the processor may be further configured to perform receiving a connection request from an aerosol generating device in a state of being paired with one or more external controllers, determining a controller type of the aerosol generating device, suspending pairing with a target external controller among the one or more external controllers when the determined controller type corresponds to a type of the target external controller and performing connection with the aerosol generating device, receiving sensing information about a state of the aerosol generating device, generating a virtual smoke image based on the sensing information, and outputting the virtual smoke image through a display of the electronic device.

Effects

It is possible to provide a method of outputting a virtual smoke image through a display of an electronic device.

It is possible to provide a method of using an aerosol generating device as a controller of an electronic device.

BEST MODE FOR CARRYING OUT THE INVENTION

Figure 1:
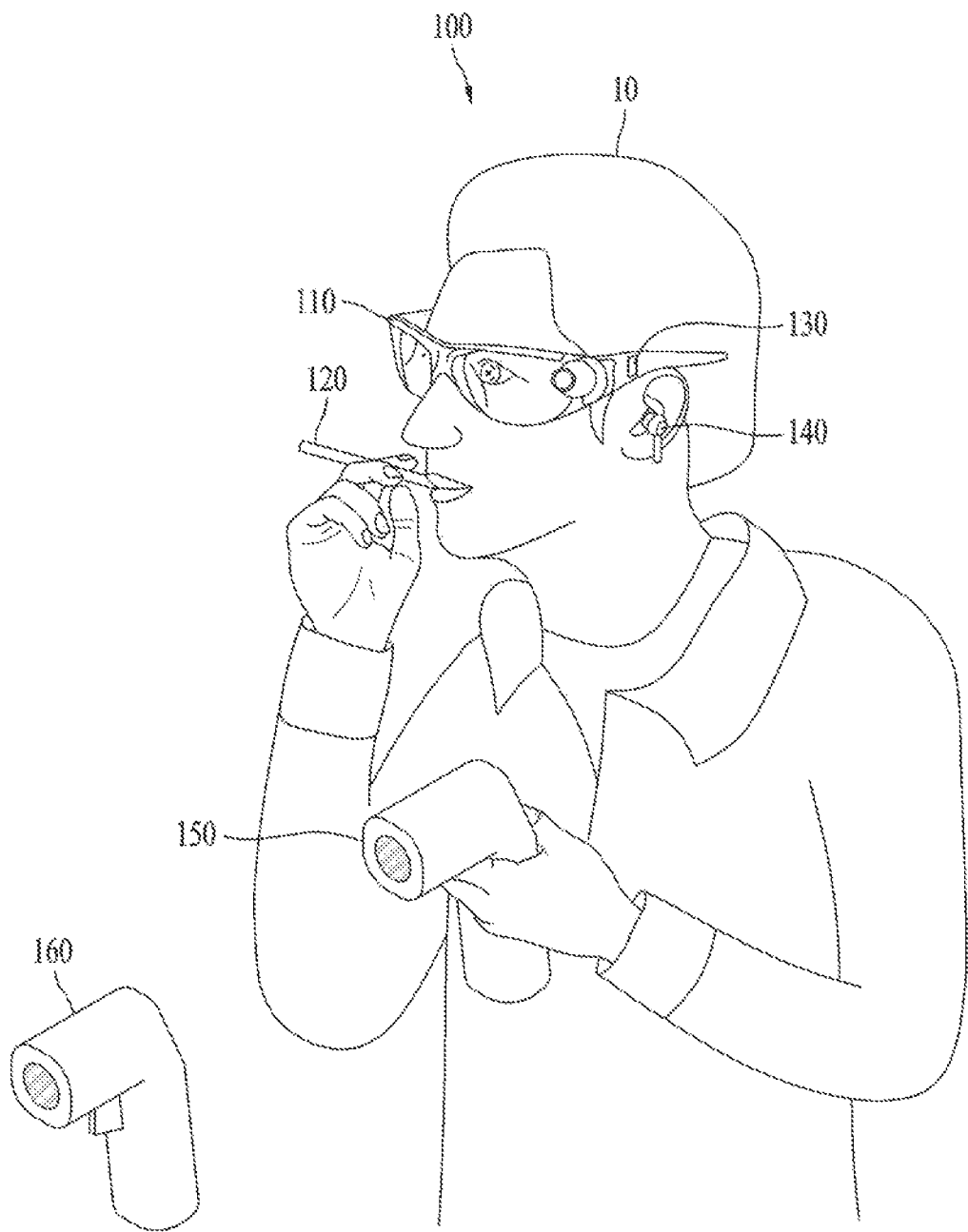
FIG. 1 is a diagram illustrating a system for outputting a virtual smoke image according to an embodiment.

The following detailed structural or functional description of embodiments is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a system for outputting a virtual smoke image according to an embodiment.

Referring to FIG. 1, a system 100 for outputting a virtual smoke image may include an electronic device 110 configured to output a virtual smoke image, an aerosol generating device 120, a dongle 130, and one or more external controllers 150 and 160. For example, a user 10 who uses the system 100 may wear the electronic device 110 and use a control function (e.g., video watching or game playing) for an existing application being executed by the electronic device 110, that is, a function to control the electronic device 110, through the one or more external controllers 150 and 160 paired with the electronic device 110.

According to an embodiment, the user 10 who uses the system 100 may wear the electronic device 110 and smoke through the aerosol generating device 120. "Smoking" may indicate heating, burning, and other actions intended to cause the release of smoke or aerosol from a substance that can be smoked. The electronic device 110 according to an embodiment may implement virtual smoke through an image in response to a smoking action of the user 10 through the aerosol generating device 120.

According to an embodiment, as shown in FIG. 1, the user 10 who uses the system 100 may smoke through the aerosol generating device 120 in a state in which the electronic device 110 and the one or more external controllers 150 and 160 are paired.

For example, the external controllers 150 and 160 may be referred to as motion controllers, touch controllers, remote controllers, or joysticks. For example, the external controllers 150 and 160 may be controllers serving as sensors for sensing movements of the hands or arms of the user 10. The external controllers 150 and 160 may sense not only up, down, left, and right movements of the hands, but also minute movements such as changes in the angles of the wrists. The external controllers 150 and 160 may include coordinate change sensors such as a gyro sensor, an acceleration sensor, and a 3-degree of freedom (DOF)/6-DOF sensor. Additionally, the external controllers 150 and 160 may further include buttons for receiving a user input through fingers.

In an embodiment, the aerosol generating device 120 may be referred to as an electronic cigarette device, an inhaler, or a smoking stick. The structure and specific operating method of the aerosol generating device 120 will be described in detail below with reference to FIG. 5.

According to an embodiment, the user may perform a smoking action using the aerosol generating device 120, and smoke may be generated from the breath of the user 10 accordingly. The aerosol generating device 120 according to an embodiment may provide an aerosol to the user 10 by heating an aerosol generating article within the aerosol generating device 120 in various manners. For example, the aerosol generating article may be a stick that is inserted into the aerosol generating device 120. As another example, the aerosol generating article may be a replaceable cartridge that is inserted into the aerosol generating device 120.

According to an embodiment, the smoke that is visually observed may be generated in the breath of the user 10 inhaling the aerosol provided to the aerosol generating device 120, but is not limited thereto. For example, smoke may not be generated in the breath of the user 10.

According to an example, a virtual smoke image may be output when the user smokes using the aerosol generating device 120 but no smoke is generated. According to an example, a virtual smoke image may be output even when the user does not actually smoke using the aerosol generating device 120. For example, a virtual smoking program in the electronic device 110 may provide a predetermined mode of generating and outputting a virtual smoke image based on sensing information received from the aerosol generating device 120. Accordingly, even when smoke is not visually observed in reality from the expiration of the user 10 smoking using the aerosol generating device 120, the user 10 may observe a virtual smoke image output by the electronic device 110, through VR or AR. However, the present disclosure is not limited thereto.

According to an embodiment, the electronic device 110 may independently provide a VR service or an AR service, or may provide a VR service or an AR service in interoperation with a third electronic device (e.g., a smartphone) connected to the aerosol generating device 120 or the electronic device 110 by a wire or wirelessly. The structure and operating method of the electronic device 110 will be described in detail below with reference to FIG. 3.

VR or AR is considered a visual simulation that generates a virtual or augmented visual environment. As used herein, the term "VR" includes simulated images that are generated for visualization for smokers and include partially or completely simulated environments. Also, as used herein, the term "AR" is considered as including a combination of simulated images used to augment a real or "live" environment, wherein a live image is used in combination with a simulated image overlaid on the live image. As a result of VR or AR, to form an interactive environment that can be seen or felt realistic, a simulated virtual image may be provided, or a live visual image may be augmented with a simulated augmented image. Hereinafter, for ease of description, a space in which VR or AR is provided is referred to as a virtual space.

According to an embodiment, the electronic device 110 may be worn on a predetermined part (e.g., the head) of a user to provide (or output) an image to the user. For example, the electronic device 110 may be configured in the form of at least one of glasses, goggles, a helmet, or a hat, but is not limited thereto.

According to an embodiment, the one or more external controllers 150 and 160 and the electronic device 110 may be paired through a wireless communication channel. For example, the wireless communication channel may be a wireless communication channel based on Bluetooth low energy (BLE), LoRa, EnOcean, radio frequency (RF) communication, Zigbee, or infrared communication.

According to an embodiment, the aerosol generating device 120 and the electronic device 110 may be connected through the dongle 130. For example, the aerosol generating device 120 and the dongle 130 may be a pair. The user may connect the dongle 130 and the electronic device 110 by inserting the dongle 130 into an interface (e.g., a universal serial bus (USB) port) of the electronic device 110. The dongle 130 may receive power for operation from the electronic device 110. A wireless communication channel may be established between the dongle 130 and the aerosol generating device 120. For example, the wireless communication channel may be a wireless communication channel based on BLE, LoRa, EnOcean, RF communication, Zigbee, or infrared communication.

According to an embodiment, the electronic device 110 may install a communication driver for the dongle 130 and a virtual smoking program using data stored in the dongle 130. The electronic device 110 and the dongle 130 may transmit and receive information through the communication driver. The electronic device 110 may generate and output a virtual smoke image by executing the virtual smoking program.

According to an embodiment, an existing application (e.g., a game) being executed by the electronic device 110 and the virtual smoking program may be executed simultaneously or in parallel.

According to an embodiment, the dongle 130 may receive sensing information about a state of the aerosol generating device 120 from the aerosol generating device 120 through the wireless communication channel. For example, the sensing information about the state of the aerosol generating device 120 may include one or more of information about the distance between the aerosol generating device 120 and an object (e.g., a body part of the user), information about a value sensed by a capacitor sensor of the aerosol generating device 120, coordinate change information of the aerosol generating device 120, monitoring information from a camera of the aerosol generating device 120, a smoking pattern learned using a pressure sensor and a button of the aerosol generating device 120, camera data, pressure sensor data, and button input information.

According to an embodiment, the data format of the sensing information received by the dongle 130 from the aerosol generating device 120 may be a wireless signal format, and the data format of the sensing information may be converted by the dongle 130 from the wireless signal format to a USB signal format. The electronic device 110 may receive the sensing information converted into the USB signal format from the dongle 130. After the virtual smoking program is executed, a virtual smoke image may be generated based on the sensing information received from the aerosol generating device 120. The virtual smoke image may be output through the display of the electronic device 110.

According to an embodiment, the aerosol generating device 120 and the electronic device 110 may be connected through the wireless communication channel. The wireless communication channel may be at least one of short-range communication or cellular communication. As an example, the short-range communication may include at least one of Bluetooth, BLE, or wireless LAN (e.g., Wi-Fi direct). As an example, the cellular communication may include at least one of long-term evolution (LTE), LTE Advance (LTE-A), fifth generation (5G) (or new radio (NR)), code-division multiple access (CDMA), wideband CDMA (WCDMA), or global system for mobile communication (GSM). Alternatively, the aerosol generating device 120 and the electronic device 110 may be connected by a wire based on a USB method. The channel through which the electronic device 110 is paired with the one or more external controllers 150 and 160 and the channel through which the electronic device 110 is paired (or connected) with the aerosol generating device 120 may be separate channels. In the above embodiment, the virtual smoking program may be stored in the electronic device 110 in advance.

According to an embodiment, the system 100 may further include a reproduction device 140. For example, the reproduction device 140 may be a device for providing sound to the user 10, and a method of providing sound is not limited. With the interoperation between the electronic device 110, the aerosol generating device 120, and the reproduction device 140 included in the system 100, a more improved smoking experience may be provided to the user 10 who uses the system 100. Although FIG. 1 illustrates the electronic device 110 and the reproduction device 140 separately, the electronic device 110 may include the reproduction device 140 according to embodiments.

According to an embodiment, the electronic device 110 may include one or more auxiliary devices. For example, the electronic device 110 may include a brainwave measurement module, a surface electromyogram (EMG) sensor, and the like to increase the sense of reality of a smoking action in a virtual space.

Figure 2:
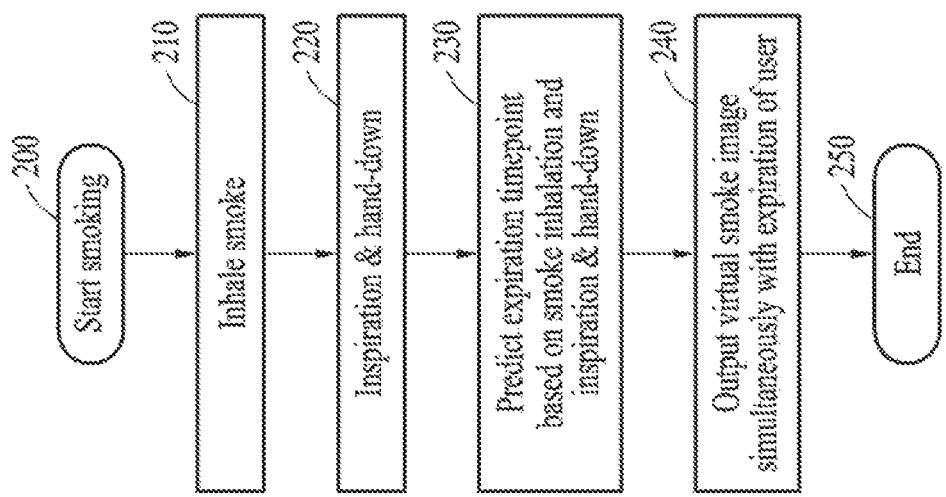
FIG. 2 is a diagram illustrating a smoking action of a user divided into intervals, and a method of predicting an expiration timepoint of a user and outputting a virtual smoke image according to an embodiment.
Figure 2:
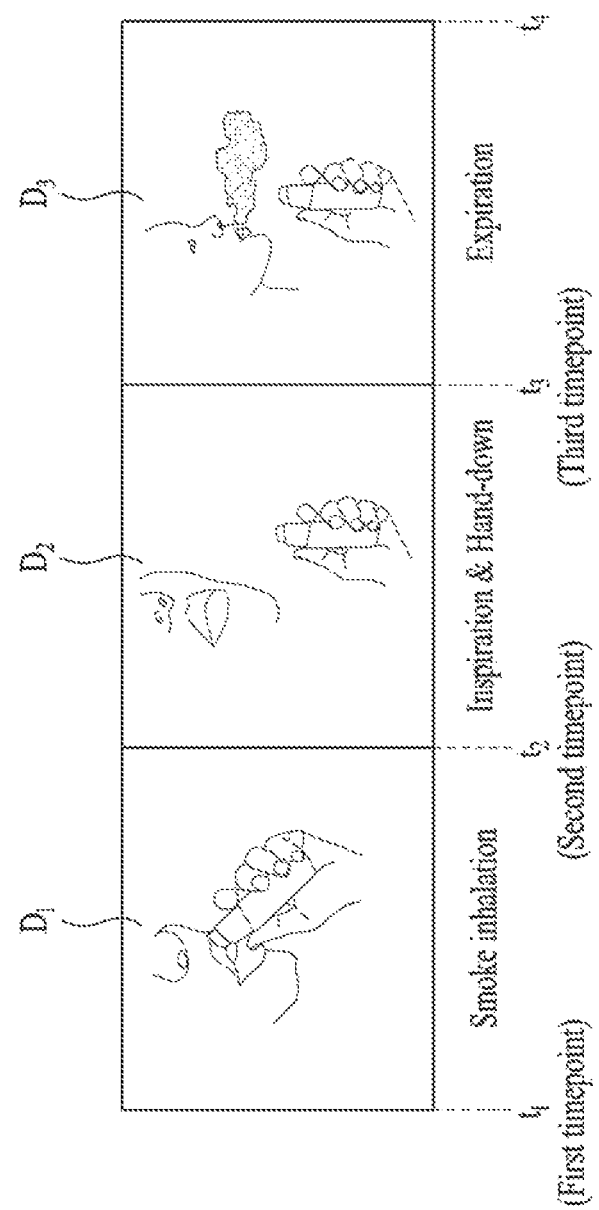

FIG. 2 is a diagram illustrating a smoking action of a user divided into intervals, and a method of predicting an expiration timepoint of a user and outputting a virtual smoke image according to an embodiment.

The description provided with reference to FIG. 1 may also apply to the description provided with reference to FIG. 2, and any repeated description related thereto will be omitted.

According to an embodiment, a user may perform a smoking action through a process from a timepoint $t_1$ to a timepoint $t_4$.

More specifically, referring to FIG. 2, according to an embodiment, the user may inhale a substance that can be smoked (e.g., an aerosol) through the aerosol generating device 120, in an interval $D_1$ between the timepoint $t_1$ and the timepoint $t_2$. The aerosol generating device 120 may generate an aerosol in various manners. Hereinafter, a motion of the user in the interval $D_1$ may be referred to as a "smoke inhalation" motion, and the user may suck the substance that can be smoked into the mouth with the aerosol generating device 120 in the mouth through the smoke inhalation motion. In the interval $D_1$, the user and one side (e.g., an intake or a mouthpiece) of the aerosol generating device 120 may be in contact with each other.

According to an embodiment, the user may inhale the smoke collected in the mouth through inspiration, in the interval $D_2$ between the timepoint $t_2$ and the timepoint $t_3$. Hereinafter, the motion of the user in the interval $D_2$ may be referred to as an "inspiration" motion (or "inspiration and hand-down" motion), and the user may take the one side of the aerosol generating device 120 away from the lips and lower the hand while performing inspiration. In the interval $D_2$, the user and the aerosol generating device 120 may be separated.

According to an embodiment, the user may exhale the inhaled smoke through expiration, in the interval $D_3$ between the timepoint $t_3$ and the timepoint $t_4$. Hereinafter, the motion of the user in the interval $D_3$ may be referred to as an "expiration" motion.

According to an embodiment, the length of the interval $D_2$ (the inspiration time) may be estimated based on the length of the interval $D_1$ (the smoke inhalation time). As an example, the length of the interval $D_2$ (the inspiration time) may be proportional to the length of the interval $D_1$ (the smoke inhalation time). For example, if the smoke inhalation time is "1" second, the inspiration time may be "1" second, and if the smoke inhalation time is "3" seconds, the inspiration time may also be "3" seconds. Alternatively, an inspiration time corresponding to a smoke inhalation time may be predicted using an artificial neural network. For example, an inspiration time corresponding to a smoke inhalation time may be predicted by inputting the smoke inhalation time into an artificial neural network trained based on pair training data of smoke inhalation times and inspiration times. However, the method of estimating the inspiration time based on the smoke inhalation time is not limited to the above example.

If it is possible to predict the length of the interval $D_2$ (the inspiration time), then it means that it is possible to predict $t_3$ (the expiration timepoint). That is, the length of the interval $D_2$ may be predicted by measuring the length of the interval $D_1$ (the smoke inhalation time), and $t_3$ (the expiration timepoint) may be predicted by adding the predicted length of the interval $D_2$ to the measured length of the interval $D_1$.

According to an embodiment, the length of the interval $D_3$ (the expiration time) may be determined based on at least one of the length of the interval $D_1$ (the smoke inhalation time) and the length of the interval $D_2$ (the inspiration time). For example, the length of the interval $D_3$ may be determined to be in proportion to the length of the interval $D_1$ or the length of the interval $D_2$. The timepoint $t_4$ may be predicted based on the predicted $t_3$ (the expiration timepoint) and the length of the interval $D_3$.

According to an embodiment, the user may set information about the length of the interval $D_3$ in the electronic device 110 in advance. For example, the ratio thereof to the length of the interval $D_1$ or the length of the interval $D_2$ may be set by the user. When the user wants to maintain the output time of virtual smoke to be relatively long, the user may set the ratio to be large.

In a virtual smoking system according to an embodiment, a user may experience VR or AR of smoking by linking smoking in the real world through the aerosol generating device 120 with the electronic device 110. More specifically, the electronic device 110 according to an embodiment may implement virtual smoke in a virtual space at the timepoint when the user actually exhales real smoke through the aerosol generating device 120, thereby implementing virtual smoke without a sense of difference.

The user of the aerosol generating device 120 according to an embodiment may perform a smoking action by repeating the motions of $D_1$ to $D_3$ at least one or more times, and the electronic device 110 or the aerosol generating device 120 may implement virtual smoke by sensing or predicting the cigarette smoke inhalation, inspiration, and expiration of the user. Hereinafter, "implementing virtual smoke" may include determining the output timepoint of the virtual smoke, that is, the expiration timepoint, and at least one property of the virtual smoke. For example, the property of the virtual smoke may include one or more of the size, shape, duration, volume, density, and color of the virtual smoke. Examples are not limited thereto in the present specification.

Referring to the flowchart of FIG. 2, according to an embodiment, when a user starts smoking in operation 200, the user may inhale a substance that can be smoked into the mouth through the aerosol generating device 120. At this time, the time for which the user inhales cigarette smoke (e.g., $D_1$) may be measured in operation 210. Thereafter, when the user finishes smoke inhalation, the user may perform an inspiration and hand-down motion. At this time, the time for which the user performs the inspiration and hand-down motion (e.g., $D_2$) may be measured in operation 220. The electronic device 110 or the aerosol generating device 120 may predict the time for which the inspiration and hand-down motion is performed and the expiration timepoint (e.g., $t_3$) at which the user starts expiration based on the smoke inhalation time 210. When the user starts expiration, the electronic device 110 may implement virtual smoke during the time for which the user performs expiration (e.g., $D_3$) in operation 240. When a predetermined time elapses after starting the expiration, the electronic device 110 may terminate outputting the virtual smoke in operation 250.

Figure 3:
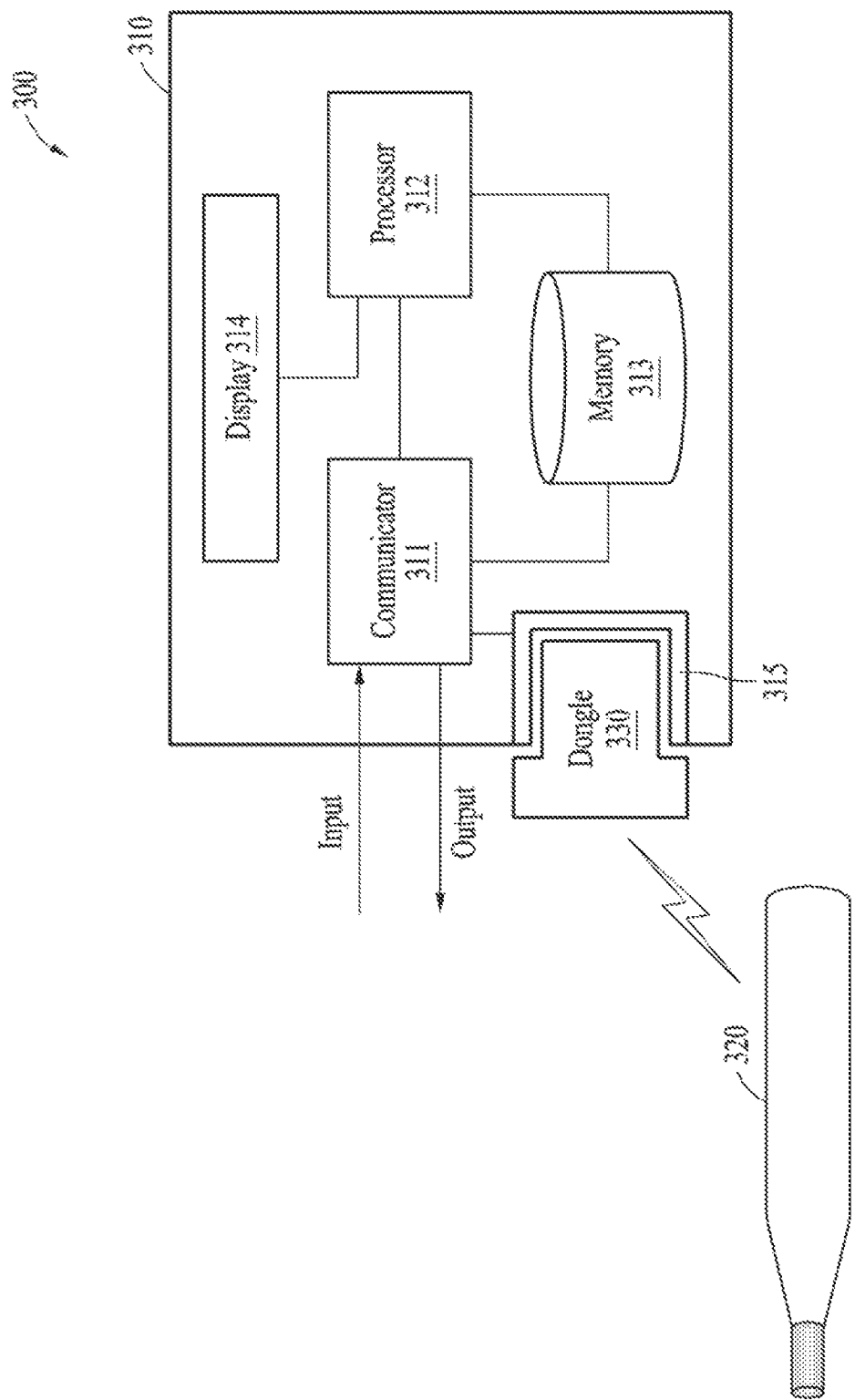
FIG. 3 is a diagram illustrating a system for outputting a virtual smoke image according to an embodiment.

FIG. 3 is a diagram illustrating a system for outputting a virtual smoke image according to an embodiment.

According to an embodiment, a system 300 (e.g., the system 100 of FIG. 1) for outputting a virtual smoke image may include an electronic device 310 (e.g., the electronic device 110 of FIG. 1) configured to output a virtual smoke image, an aerosol generating device 320 (e.g., the aerosol generating device 120 of FIG. 1), a dongle 330 (e.g., the dongle 130 of FIG. 1), and one or more external controllers (e.g., the external controllers 150 and 160 of FIG. 1). For example, the aerosol generating device 320 and the dongle 330 may be a pair. For example, the aerosol generating device 320 may be an electronic cigarette or an inhaling device such as an inhaler.

According to an embodiment, the electronic device 310 may include a communicator 311, a processor 312, a memory 313, a display 314, and a USB port 315. The electronic device 310 may be a device for VR, AR, or metaverse, but the present embodiment is not limited thereto.

The communicator 311 is connected to the processor 312 and the memory 313 and transmits and receives data to and from the processor 312 and the memory 313. The communicator 311 may be connected to another external device and transmit and receive data to and from the external device. Hereinafter, transmitting and receiving "A" may refer to transmitting and receiving "information or data indicating A".

The communicator 311 may be implemented as circuitry in the electronic device 310. For example, the communicator 311 may include an internal bus and an external bus. As another example, the communicator 311 may be an element configured to connect the electronic device 310 and an external device (e.g., the dongle 330 or one or more external controllers). The communicator 311 may be an interface. The communicator 311 may receive data from the external device (e.g., the dongle 330 or the one or more external controllers) and transmit the data to the processor 312 and the memory 313.

The processor 312 may process the data received by the communicator 311 and data stored in the memory 313. A "processor" may be a hardware-implemented data processing device having a physically structured circuit to execute desired operations. For example, the desired operations may include code or instructions included in a program. For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 312 may execute computer-readable code (e.g., software) stored in a memory (e.g., the memory 313) and instructions triggered by the processor 312. For example, the processor 312 may execute an instruction to output a virtual smoke image through the display 314.

The memory 313 may store therein the data received by the communicator 311 and the data processed by the processor 312. For example, the memory 313 may store programs, applications, or software (e.g., a communication driver and a virtual smoking program). The program to be stored may be a set of syntaxes that are coded to output a virtual smoke image and are executable by the processor 312.

According to an aspect, the memory 313 may include, for example, at least one volatile memory, nonvolatile memory, random-access memory (RAM), flash memory, a hard disk drive, and an optical disc drive.

The memory 313 may store an instruction set (for example, software) for operating the electronic device 310. The instruction set for operating the electronic device 310 is executed by the processor 312.

According to an embodiment, the one or more external controllers and the electronic device 310 may be paired through a wireless communication channel. For example, the wireless communication channel may be a wireless communication channel based on BLE, LoRa, EnOcean, RF communication, Zigbee, or infrared communication. According to an embodiment, the electronic device 310 may be paired and connected respectively with the one or more external controllers and the aerosol generating device 320 through separate channels. For example, the electronic device 310 and the one or more external controllers may be paired through a Bluetooth communication channel, whereas, as described below, the electronic device 310 and the aerosol generating device 320 may be connected as the dongle 330 is connected to the USB port 315 of the electronic device 310.

According to an embodiment, the electronic device 310 and the aerosol generating device 320 may be connected through the dongle 330. For example, the dongle 330 may be connected to the USB port 315 of the electronic device 310. The communication driver and the virtual smoking program stored in the dongle 330 may be installed in the electronic device 310 from the dongle 330.

According to an embodiment, when the dongle 330 is connected (or inserted or coupled) to the USB port 315 of the electronic device 310, the communication driver and the virtual smoking program may be automatically installed in the electronic device 310. For example, the communication driver and the virtual smoking program may be installed or stored in the memory 313.

According to an embodiment, the communication driver and the virtual smoking program may be installed when a separate input is received from a user after the dongle 330 is connected to the USB port 315 of the electronic device 310.

According to an embodiment, the processor 312 may execute the virtual smoking program. For example, the virtual smoking program may be automatically executed after installation. As another example, the virtual smoking program may be executed when a smoking start signal is received from the user or a smoking start signal is received from the aerosol generating device 320. The processor 312 may generate a virtual smoke image based on sensing information about the state of the aerosol generating device 320 received from the aerosol generating device 320 through the dongle 330.

The electronic device 310 may provide the user with a VR, AR, or metaverse image in which cigarette smoke is generated through the display 314. In an embodiment, the display 314 may be controlled to be transparent or opaque depending on the purpose of use. When the electronic device 310 provides a VR or metaverse image, the display 314 may be controlled to be opaque, and when the electronic device 310 provides an AR image, the display 314 may be controlled to be transparent.

For example, the display 314 may include plastic such as polycarbonate or glass, but is not limited thereto. In addition, at least one coating method of anti-reflective and anti-glare coating, anti-fog coating, and ultraviolet (UV)-protective coating may be applied to the display 314.

According to an example, the system 300 may further include an article. The electronic device 310 may receive content information of the article from the article. The electronic device 310 may change an image displayed on the display 314 based on the content information of the article.

In an embodiment, an image of cigarette smoke may be displayed on the display 314, and the electronic device 310 may change the image in relation to at least one of the color, amount, and shape of the cigarette smoke displayed on the display 314 based on the content information of the article.

The electronic device 310 may further include a camera (not shown). When the user uses the electronic device 310, the camera may scan a surrounding situation of reality to help the user with using the electronic device 310.

Applications may be installed on the electronic device 310 to provide various experiences to the user. For example, a virtual space smoking system may be provided by installing a smoking application to provide the user with a smoking experience close to reality. However, the present disclosure is not limited thereto.

The electronic device 310 may further include a sensor for sensing or predicting a smoking action of the user in the system 300. For example, the sensor may include a surface EMG sensor or a brainwave measurement module that is attachable to the skin of the user to sense a smoking motion of the user. The electronic device 310 may include a communication device for communicating with the article. However, the present disclosure is not limited thereto.

Figure 4:
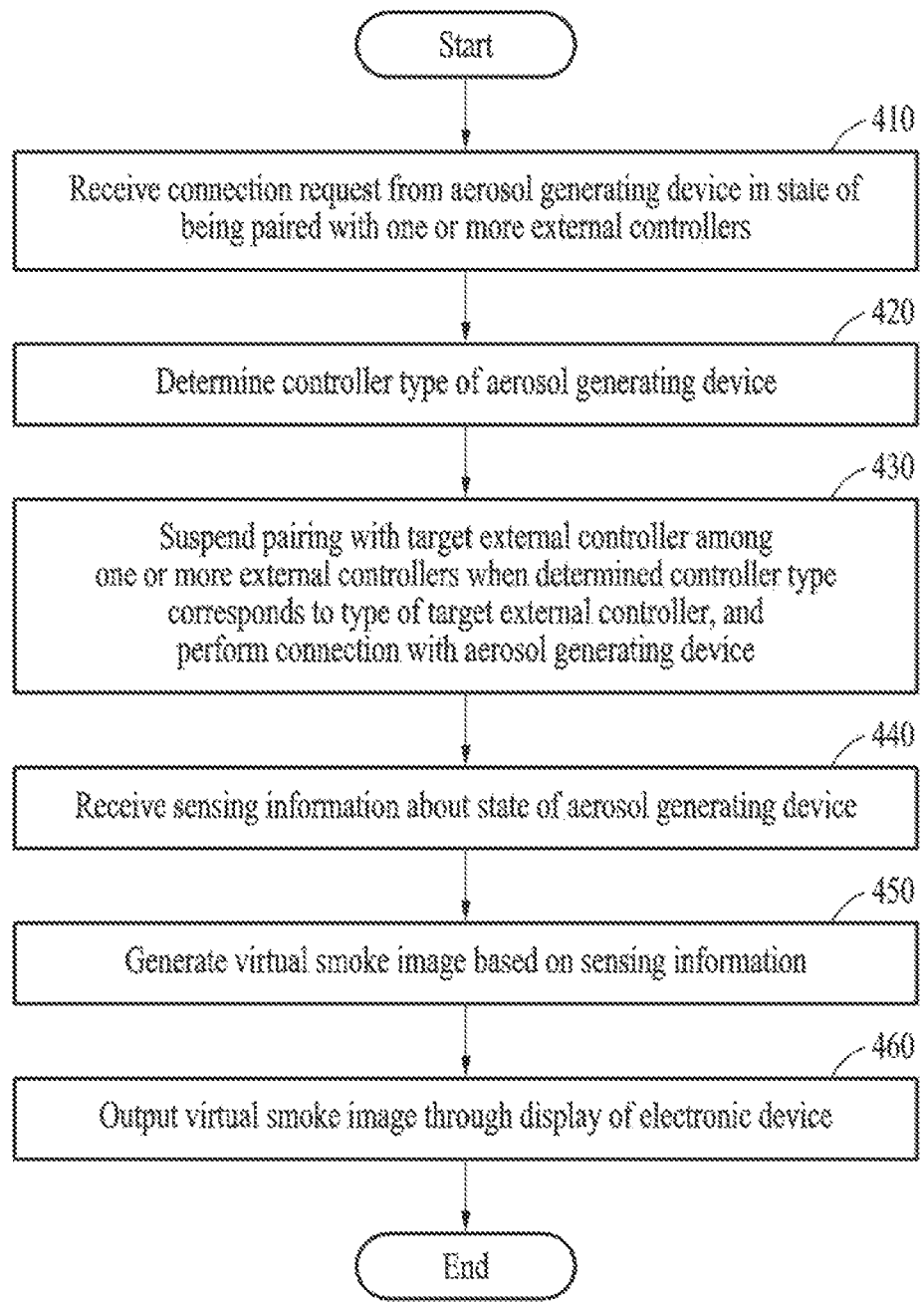
FIG. 4 is a flowchart illustrating a method of outputting a virtual smoke image according to an embodiment.

FIG. 4 is a flowchart illustrating a method of outputting a virtual smoke image according to an embodiment.

The following operations 410 to 460 may be performed by the electronic device 310 described above with reference to FIG. 3.

The following operations 410 to 460 may be performed while an existing application is being executed by the electronic device 310. That is, the existing application and the virtual smoking program may be executed at the same time.

In operation 410, the electronic device 310 may receive a connection request from the aerosol generating device 320 in a state of being paired with one or more external controllers (e.g., the external controllers 150 and 160 of FIG. 1).

In an embodiment, the one or more external controllers and the electronic device 310 may be paired through a wireless communication channel. For example, the wireless communication channel may be a wireless communication channel based on BLE, LoRa, EnOcean, RF communication, Zigbee, or infrared communication.

In an embodiment, at a timepoint at which the electronic device 310 receives a connection request from the aerosol generating device 320, an existing application (e.g., a game) may be being executed using the one or more external controllers as the existing application is executed by the electronic device 310.

In an embodiment, the electronic device 310 may receive a connection request from the aerosol generating device 320 through the dongle 330. Specifically, the connection request may be received from the aerosol generating device 320 establishing a wireless communication channel with the dongle 330 through the dongle 330 connected to the electronic device 310. For example, the wireless communication channel may be a wireless communication channel based on BLE, LoRa, EnOcean, RF communication, Zigbee, or infrared communication.

In an embodiment, the electronic device 310 may receive a connection request from the aerosol generating device 320 through a wireless communication channel. For example, the connection request may be received from the aerosol generating device 320 directly establishing the wireless communication channel with the electronic device 310. The wireless communication channel may be at least one of short-range communication or cellular communication. As another example, the aerosol generating device 320 and the electronic device 310 may be connected by a wire based on a USB method. The electronic device 310 may be paired and connected respectively with one or more external controllers and the aerosol generating device 320 through separate channels. In the above embodiment, the virtual smoking program may be stored in the electronic device 310 in advance.

In an embodiment, the electronic device 310 may receive a connection request between the aerosol generating device 320 and the electronic device 310 directly from the user through a user interface (UI) of the electronic device 310.

In operation 420, the electronic device 310 may determine a controller type of the aerosol generating device 320. For example, the controller type may include a left-handed controller type, a right-handed controller type, or a mouthpiece-like controller type.

In an embodiment, the controller type of the aerosol generating device 320 may be directly input from a user through the UI of the electronic device 310.

In an embodiment, the controller type of the aerosol generating device 320 may be determined to correspond to a controller type of one external controller of which a movement is not detected at the timepoint at which the connection request is received from the aerosol generating device 320.

In an embodiment, the controller type of the aerosol generating device 320 may be determined based on sensing information from a gyro sensor or a coordinate sensor of the aerosol generating device 320. Alternatively, the controller type of the aerosol generating device 320 may be determined based on sensing information from a pressure sensor or a capacitor sensor of the aerosol generating device 320. For example, when sensing information from the pressure sensor of the aerosol generating device 320 indicates that an object (e.g., the lips of the user) is in contact with one side of the aerosol generating device 320, the controller type of the aerosol generating device 320 may be determined to be a mouthpiece-like controller type.

In operation 430, the electronic device 310 may suspend pairing with a target external controller among the one or more external controllers when the determined controller type corresponds to a type of the target external controller and perform connection with the aerosol generating device 320.

In an embodiment, the controller type of the one or more external controllers may be preset. Alternatively, the controller type of the one or more external controllers may be determined when the electronic device 310 and the one or more external controllers are paired. Alternatively, the controller type of the one or more external controllers may be determined using information sensed by sensors of the one or more external controllers.

In an embodiment, the controller type of the aerosol generating device 320 may be determined to be a right-handed controller type, which corresponds to the type of a target external controller held in the right hand by the user (i.e., the right-handed controller type) among the one or more external controllers. Thus, the electronic device 310 may suspend pairing with the target external controller and perform connection with the aerosol generating device 320. The user may use a control function (e.g., game playing) for the existing application being executed by the electronic device 310 through the aerosol generating device 320 in the right hand and the external controller in the left hand.

In operation 440, the electronic device 310 may receive sensing information about a state of the aerosol generating device 320. For example, the sensing information may include one or more of information about the distance between the aerosol generating device 320 and an object (e.g., a body part of the user), information about a value sensed by a capacitor sensor of the aerosol generating device 320, coordinate change information of the aerosol generating device 320, monitoring information from a camera of the aerosol generating device 320, a smoking pattern learned using a pressure sensor and a button of the aerosol generating device 320, camera data, pressure sensor data, and button input information. The sensing information of the aerosol generating device 320 will be described further in detail below with reference to FIG. 5.

In an embodiment, the sensing information of the aerosol generating device 320 may include sensing information for virtual smoking and sensing information for controlling the existing application being executed by the electronic device 310. For example, the sensing information for virtual smoking may include sensing information for outputting a virtual smoke image. For example, the sensing information for controlling the electronic device 310 may include one or more of coordinate change information and button input information of the aerosol generating device 320. The coordinate change information of the aerosol generating device 320 may be sensing information from a gyro sensor, an acceleration sensor, or a 3-DOF/6-DOF sensor.

In an embodiment, while the user is using the control function for the existing application being executed by the electronic device 310, the electronic device 310 may receive coordinate change information (indicating that the user brings the aerosol generating device 320 close to the lips) of the aerosol generating device 320 moving upward in excess of a predetermined threshold value and/or button input information (indicating that the user starts smoking) of the aerosol generating device 320. For example, when a smoking function of the aerosol generating device 320 is activated, the control function for the existing application through the aerosol generating device 320 may be temporarily suspended, and a virtual smoke image may be generated and output through operations 450 and 460 described below. Even if the control function for the existing application through the aerosol generating device 320 is temporarily suspended, the function of the remaining external controller may not be suspended.

In an embodiment, the sensing information for controlling the electronic device 310 may further include at least a portion of the sensing information for virtual smoking. For example, while the user is using the control function for the existing application being executed by the electronic device 310, the electronic device 310 may receive coordinate change information (indicating that the user brings the aerosol generating device 320 close to the lips) and/or capacitance change information (indicating that the aerosol generating device 320 touches the lips of the user) of the aerosol generating device 320 moving upward in excess of a predetermined threshold value. As another example, while the user is using the control function for the existing application being executed by the electronic device 310, the electronic device 310 may receive button input information (indicating that the user starts smoking) and pressure sensor data (indicating that the user starts inhaling through the aerosol generating device 320) of the aerosol generating device 320. When the sensing information for virtual smoking is received from the aerosol generating device 320, the electronic device 310 may temporarily suspend the control function through the aerosol generating device 320 and generate and output a virtual smoke image through operations 450 and 460 described below.

In an embodiment, controlling the electronic device 310 by the aerosol generating device 320 may be resumed at each interval between repeated inhalations of the user through the aerosol generating device 320 again after starting inhaling through the aerosol generating device 320.

In an embodiment, controlling the electronic device 310 by the aerosol generating device 320 may be performed based on coordinate change information of the aerosol generating device 320 and monitoring information from a camera of the aerosol generating device 320.

In operation 450, the electronic device 310 may generate a virtual smoke image based on the sensing information for virtual smoking.

In an embodiment, the electronic device 310 may determine a property of virtual smoke based on the sensing information. For example, the electronic device 310 may determine the property of the virtual smoke based on the sensing information for virtual smoking described in operation 440. For example, the property of the virtual smoke may include one or more of the size, shape, duration, volume, density, and color of the virtual smoke. Examples are not limited thereto in the present specification. The electronic device 310 may generate the virtual smoke image based on the property of the virtual smoke.

In operation 460, the virtual smoke image may be output through the display of the electronic device 310.

In an embodiment, the electronic device 310 may determine an expiration timepoint based on a first time when the distance between one side of the aerosol generating device 320 and a body part of the user, detected by the aerosol generating device 320, reaches within a first threshold value and a second time when the distance between the one side of the aerosol generating device 320 and the body part of the user exceeds a second threshold value after the first time.

In an embodiment, the electronic device 310 may determine the expiration timepoint based on a first time when a value of the capacitance of the aerosol generating device 320, sensed by the aerosol generating device 320, reaches within a first threshold value and a second time when the value of the capacitance of the aerosol generating device 320 exceeds a second threshold value after the first time.

In an embodiment, the electronic device 310 may output the virtual smoke image to be superimposed on a reference image (e.g., a game image) for an existing application being executed by the electronic device 310. For example, the electronic device 310 may output images to overlap each other using a layer for outputting the reference image and a virtual smoke image layer. The user may observe the overlapping images.

In an embodiment, the virtual smoke image may be output to be synthesized with a scene in the reference image content. For example, the image may be output so that virtual smoke appears in the scene in the reference image.

Even when smoke is not visually observed in reality, the user may observe smoke through an image in which virtual smoke appears and have a satisfactory feeling of smoking through the observed smoke.

Figure 5:
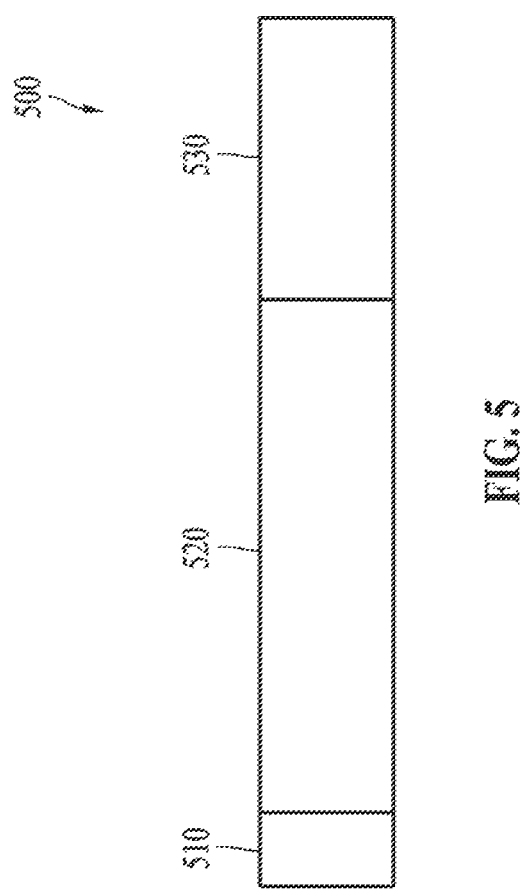
FIG. 5 illustrates an example of an aerosol generating device according to an embodiment.

FIG. 5 illustrates an example of an aerosol generating device according to an embodiment.

Referring to FIG. 5, an aerosol generating device 500 (e.g., the aerosol generating device 120 of FIG. 1 or the aerosol generating device 320 of FIG. 3) may have a cigarette shape. For example, the length and diameter of the aerosol generating device 500 may be substantially the same as those of a conventional cigarette, but are not limited thereto. The aerosol generating device 500 may be divided into a first end portion 510, a middle portion 520, and a second end portion 530.

The first end portion 510 may be a portion for reproducing a burning portion of a cigarette. The first end portion 510 may include a light-emitting diode (LED). For example, the first end portion 510 may include a red LED.

The second end portion 530 may contain nicotine. In an embodiment, the surface of the second end portion 530 may be coated with nicotine, or an aerosol generating article may be included in the second end portion 530. For example, when the aerosol generating article is heated, an aerosol including nicotine may be generated. When the user inhales the aerosol with the second end portion 530 of the aerosol generating device 500 in the mouth, nicotine may be provided to the user. Meanwhile, the second end portion 530 may further include a fragrance portion including a fragrance, in addition to the aerosol generating article.

In an embodiment, the middle portion 520 may serve to connect the first end portion 510 and the second end portion 530. The total length of the aerosol generating device 500 may be determined according to the length of the middle portion 520, and when manufacturing the aerosol generating device 500, the length of the middle portion 520 may be set such that the length of the aerosol generating device 500 may correspond to the length of a typical cigarette.

In another embodiment, the aerosol generating device 500 may be an electronic device including other electronic equipment or electronic circuits therein (e.g., in the middle portion 520). For example, the aerosol generating device 500 may include sensors for obtaining sensing information about a state of the aerosol generating device 500 or sensing a smoking action of a user. The sensors may include, for example, a sensor for detecting a change in distance, a sensor for detecting a change in coordinates, a sensor for detecting a change in capacitance, and a pressure sensor. The aerosol generating device 500 may be an electronic device including other electronic equipment outside a housing thereof. For example, the aerosol generating device 500 may include a camera for observing a smoking action of the user. The aerosol generating device 500 may have a button inside or outside for a power control function, a smoking pattern learning function, a smoking detection function, or a function for controlling the electronic device 310. The aerosol generating device 500 may be an electronic device including a communication device for communicating with an extended reality (XR) device (e.g., the electronic device 110 of FIG. 1 or the electronic device 310 of FIG. 3). However, the present disclosure is not limited to an aerosol generating device including sensors, a camera, or a button. Hereinafter, methods of determining an expiration timepoint using different types of sensing information will be described. The same or similar description may be omitted.

<Distance Information from Distance Detection Sensor>

According to an embodiment, a distance detection sensor may be positioned inside or outside the second end portion 530. The distance detection sensor according to an embodiment may be an infrared sensor, a lidar sensor, or an ultrasonic sensor. However, the distance detection sensor in the present disclosure is not limited to the sensors mentioned above. Hereinafter, a method of determining an expiration timepoint at which a user starts expiration using a distance detection sensor according to an embodiment will be described in detail.

According to an embodiment, when the user starts smoking, the distance detection sensor may sense the distance between an object (e.g., the lips of the user) and the aerosol generating device 500. The aerosol generating device 500 may transmit sensing information from the distance detection sensor to the electronic device 110 (or the electronic device 310) through a dongle (e.g., the dongle 130 of FIG. 1 or the dongle 330 of FIG. 3). The electronic device 310 may determine the expiration timepoint based on the sensing information from the distance detection sensor, received from the aerosol generating device 500.

According to an embodiment, the motion of starting smoking may include a motion of the user performing inspiration with the aerosol generating device 500 brought to the lips. The user may power on the aerosol generating device 500 to start heating an aerosol generating article therein, and the powered-on aerosol generating device 500 may preheat a heater for heating the aerosol generating article.

According to an embodiment, the operation of sensing the distance between an object (e.g., a body part of the user) and the aerosol generating device 500 by the distance detection sensor may include an operation of detecting a first time when the object contacts the second end portion 530 of the aerosol generating device 500 and an operation of detecting a second time when the object moves away from the second end portion 530. For example, the operation of detecting the first time may include detecting the approach of the second end portion 530 of the aerosol generating device 500 to the object within a first threshold distance by the distance detection sensor. For example, the operation of detecting the second time may include detecting the separation of the object from the second end portion 530 of the aerosol generating device 500 by more than a second threshold distance after the contact by the distance detection sensor.

According to an embodiment, the operation of determining the expiration timepoint at which the user starts expiration includes an operation of determining the expiration timepoint based on an interval between the first time and the second time. The first time may be a timepoint at which the user starts inhaling smoke. The interval between the first time and the second time may be the time for which the user inhales smoke, and a first respiration time of the user may be predicted based on the smoke inhalation time. The second time may be a timepoint at which the user starts inspiration. A timepoint of second respiration may be predicted based on the interval between the first time and the second time and the first respiration time. The timepoint of second respiration may be the expiration timepoint of the user. For example, the timepoint of second respiration may be determined to be the expiration timepoint.

According to an embodiment, since the smoke inhalation time of the user is the interval between the first time and the second time, the first respiration time, which is the time for which the user performs inspiration, may be estimated to be similar to the smoke inhalation time. Thereafter, the electronic device 310 may determine the timepoint of second respiration, which is the timepoint at which the user starts expiration, to be a timepoint at which the first respiration time elapses from the second time. For example, if an interval between the first time when the object is in contact with the second end portion 530 and the second time when the object moves away from the second end portion 530 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second time may be predicted to be a timepoint at which "1" second elapses after the object is separated from the aerosol generating device 500. Accordingly, the electronic device 310 may determine the timepoint at which "1" second elapses after the object is separated to be the expiration timepoint.

According to an embodiment, the operation of determining the expiration timepoint based on distance sensing information includes an operation of estimating an intake volume and a respiration volume of the user based on the interval between the first time and the second time. The intake volume of the user may include an intake volume of an aerosol that is inhaled by the user through the aerosol generating device 500 in a state in which the aerosol generating device 500 and the object are in contact. The respiration volume of the user may include an inspiration volume inhaled by the user in a state in which the aerosol generating device 500 and the object are not in contact. The expiration timepoint may be determined based on the estimated respiration volume and the estimated intake volume.

According to an embodiment, the operation of determining the expiration timepoint based on sensing information includes an operation of determining whether the aerosol generating device 500 satisfies a predetermined operating condition and an operation of determining the expiration timepoint based on a determination that the aerosol generating device 500 satisfies the operating condition. The predetermined operating condition may include at least one of whether the user powers on/off the aerosol generating device 500 or whether a puff sensor included in the aerosol generating device and a pressure sensor included in the aerosol generating device operate. The value sensed by the distance detection sensor may change due to an object (e.g., a finger) other than a determined object, and the distance detection sensor may be configured to operate only when the user powers on/off the aerosol generating device 500, or the distance detection sensor may be configured to operate in response to sensing inhalation of the user through the puff sensor or the pressure sensor. However, a suction sensor of the present disclosure is not limited to a puff sensor or a pressure sensor.

According to an embodiment, the operation of transmitting the sensing information to the electronic device 310 through the dongle 330 may include an operation of transmitting information about the type of virtual smoke and an operation of transmitting information about a delay occurring in communication between the aerosol generating device 500 and the electronic device 310. The type of virtual smoke may change according to the selection of the user, or may change according to an aerosol generating article or a fragrance portion embedded in the second end portion 530. In addition, the sensing information may include information about the amount of smoking or the respiration volume of the user, and the present disclosure is not limited thereto. If the expiration timepoint does not coincide with the actual smoking action of the user or it fails to predict an accurate timepoint, an additional task may be performed to proceed with a separate "expiration predict sensing" processing process.

<Sensing Value Information from Capacitor Sensor>

According to an embodiment, a capacitor sensor may be positioned inside or outside the second end portion 530. The capacitor sensor according to an embodiment may be a sensor configured based on a capacitor. However, the capacitor sensor of the present disclosure is not limited to the sensor mentioned above. Hereinafter, a method of determining an expiration timepoint at which a user starts expiration using a capacitor sensor according to an embodiment will be described in detail.

According to an embodiment, when the user starts smoking, the capacitor sensor may sense the capacitance of the capacitor sensor that changes when an object (e.g., the lips of the user) is in contact with the aerosol generating device 500. For example, the capacitor sensor may monitor a change value of the capacitance. The aerosol generating device 500 may transmit the sensing information from the capacitor sensor to the electronic device 310 through the dongle 330. The electronic device 310 may determine the expiration timepoint based on the sensing information from the capacitor sensor, received from the aerosol generating device 500.

According to an embodiment, the motion of starting smoking may include a motion of the user performing inspiration with the aerosol generating device 500 in contact with the lips. The user may power on the aerosol generating device 500 to start heating an aerosol generating article therein, and the powered-on aerosol generating device 500 may preheat a heater for heating the aerosol generating article.

According to an embodiment, the operation of monitoring, by the capacitor sensor, the capacitance that changes when the object and the aerosol generating device 500 are in contact may include an operation of detecting a first time when the object is in contact with the second end portion 530 of the aerosol generating device 500 and an operation of detecting a second time when the object moves away (or is separated) from the second end portion 530. For example, the operation of detecting the first time may include detecting the sensed capacitance reaching within a first threshold value by the capacitor sensor when the object is in contact with the second end portion 530 of the aerosol generating device 500. For example, the operation of detecting the second time may include detecting the sensed capacitance exceeding a second threshold value by the capacitor sensor when the object is separated from the second end portion 530 of the aerosol generating device 500 after the contact.

According to an embodiment, the operation of determining the expiration timepoint based on the capacitance sensing information by the electronic device 310 includes an operation of determining the expiration timepoint based on an interval between the first time and the second time. The first time may be a timepoint at which the user starts inhaling smoke. The interval between the first time and the second time may be the time for which the user inhales smoke, and a first respiration time of the user may be predicted based on the smoke inhalation time. The second time may be a timepoint at which the user starts inspiration. A timepoint of second respiration may be predicted based on the interval between the first time and the second time and the first respiration time. The timepoint of second respiration may be the timepoint at which the user starts expiration. For example, the timepoint of second respiration may be determined to be the expiration timepoint.

According to an embodiment, since the smoke inhalation time of the user is the interval between the first time and the second time, the first respiration time, which is the time for which the user performs inspiration, may be estimated to be similar to the smoke inhalation time. Thereafter, the electronic device 310 may determine the timepoint of second respiration, which is the timepoint at which the user starts expiration, to be a timepoint at which the first respiration time elapses from the second time. For example, if an interval between the first time when the object is in contact with the second end portion 530 and the second time when the object moves away from the second end portion 530 is "1" second, the first respiration time may be estimated to be "1" second, and the time for which the user performs inspiration may also be predicted to be "1" second, similar to the first respiration time. Accordingly, the timepoint of second respiration at which the first respiration time elapses from the second time may be predicted to be a timepoint at which "1" second elapses after the object is separated from the aerosol generating device 500. Accordingly, the electronic device 310 may determine the timepoint at which "1" second elapses after the object is separated to be the expiration timepoint.

According to an embodiment, the operation of determining the expiration timepoint based on capacitance sensing information includes an operation of estimating an intake volume and a respiration volume of the user based on the interval between the first time and the second time. The intake volume of the user may include an intake volume of an aerosol that is inhaled by the user through the aerosol generating device 500 in a state in which the aerosol generating device 500 and the object are in contact. The respiration volume of the user may include an inspiration volume inhaled by the user in a state in which the aerosol generating device 500 and the object are not in contact. The expiration timepoint may be determined based on the estimated respiration volume and the estimated intake volume.

According to an embodiment, the operation of determining the expiration timepoint based on the capacitance sensing information by the electronic device 310 includes an operation of determining whether the aerosol generating device 500 satisfies a predetermined operating condition, and an operation of determining the expiration timepoint based on a determination that the aerosol generating device 500 satisfies the operating condition. The predetermined operating condition may include at least one of whether the user powers on/off the aerosol generating device 500 or whether a puff sensor included in the electronic device and a pressure sensor included in the aerosol generating device operate. The value sensed by the capacitor sensor may change due to an object (e.g., a finger) other than a determined object, and the capacitor sensor may be configured to operate only when the user powers on/off the aerosol generating device, or the capacitor sensor may be configured to operate in response to sensing inhalation of the user through the puff sensor or the pressure sensor. However, a suction sensor of the present disclosure is not limited to a puff sensor or a pressure sensor.

According to an embodiment, the operation of transmitting the sensing information from the capacitor sensor to the electronic device 310 through the dongle 330 includes an operation of transmitting information about the type of virtual smoke and an operation of transmitting information about a delay occurring in communication between the aerosol generating device 500 and the electronic device 310. The type of virtual smoke may change according to the selection of the user, or may change according to an aerosol generating article or a fragrance portion embedded in the second end portion 530. In addition, the sensing information may include information about the amount of smoking or the respiration volume of the user, and the present disclosure is not limited thereto.

<Coordinate Change Information>

According to an embodiment, a coordinate change sensor may be positioned inside or outside the second end portion 530. The coordinate change sensor according to an embodiment may be a sensor such as a gyro sensor, an acceleration sensor, or a 3-DOF/6-DOF sensor. However, the coordinate change sensor of the present disclosure is not limited to the sensors mentioned above. Hereinafter, a method of determining an expiration timepoint at which a user starts expiration using a coordinate change sensor according to an embodiment will be described in detail.

According to an embodiment, when the user starts smoking, the coordinate change sensor may sense a coordinate change of the aerosol generating device 500 relative to an object (e.g., the lips of the user). The aerosol generating device 500 may transmit the sensing information from the coordinate change sensor to the electronic device 310 through the dongle 330. The electronic device 310 may determine an expiration timepoint based on the sensing information from the coordinate change sensor.

According to an embodiment, the operation of sensing the coordinate change of the aerosol generating device 500 relative to the object by the coordinate change sensor may include an operation of detecting a first time when the object contacts the second end portion 530 of the aerosol generating device 500 and an operation of detecting a second time when the object moves away from the second end portion 530. For example, the operation of detecting the first time may include detecting the approach of the second end portion 530 of the aerosol generating device 500 to coordinates within a first threshold value relative to the object by the coordinate change sensor and detecting a change in the acceleration while the user brings the aerosol generating device 500 to the object. For example, the operation of detecting the second time may include detecting the separation of the object from the second end portion 530 of the aerosol generating device 500 to coordinates exceeding a second threshold value after the contact and detecting a change in the acceleration while the user separates the aerosol generating device 500 from the object.

According to an embodiment, a coordinate change may be measured by comparing the x, y, and z-axis coordinates of the aerosol generating device 500 when the user is lowering his/her hand with the x, y, and z-axis coordinates of the aerosol generating device 500 when the user brings the aerosol generating device 500 to be in contact with the object. When the user moves his or her hand to move the aerosol generating device 500, the measured acceleration may increase and then decrease and stop. The coordinate change may be predicted by measuring an interval in which the acceleration changes, and a smoking time of the user may be estimated based on the predicted coordinate change.

According to an embodiment, the operation of determining the expiration timepoint based on the coordinate change sensing information by the electronic device 310 includes an operation of determining the expiration timepoint based on an interval between the first time and the second time. Hereinafter, the process of determining the expiration timepoint is the same as that using the capacitor sensor, and thus, a description thereof will be omitted.

<Monitoring Information from Camera>

According to an embodiment, a camera may be positioned on an outer surface of a housing of the aerosol generating device 500. Hereinafter, a method of determining an expiration timepoint at which a user starts expiration using a camera according to an embodiment will be described.

According to an embodiment, when a user starts smoking, the camera may monitor a motion of an object (e.g., the lips of a user). The aerosol generating device 500 may transmit monitoring information (i.e., sensing information) from the camera to the electronic device 310 through the dongle 330. The electronic device 310 may determine an expiration timepoint based on the monitoring information from the camera.

According to an embodiment, the operation of monitoring the distance between the object and the aerosol generating device 500 by the camera may include an operation of detecting a first time when the motion of the object changes so that the object is in contact with the second end portion 530 of the aerosol generating device 500 and an operation of detecting a second time when the motion of the object changes so that the object is separated from the second end portion 530. For example, the operation of detecting the first time may include detecting, by the camera, a first motion of the object to bring the second end portion 530 of the aerosol generating device 500 to be in contact with the lips. For example, the operation of detecting the second time may include detecting, by the camera, a second motion of the object so as to be separated from the second end portion 530 of the aerosol generating device 500.

According to an embodiment, the operation of determining the expiration timepoint based on the monitoring information from the camera by the electronic device 310 includes an operation of determining the expiration timepoint based on an interval between the first time and the second time. Hereinafter, the process of determining the expiration timepoint is the same as that using the capacitor sensor, and thus, a description thereof will be omitted.

<Smoking Pattern Learned Using Pressure Sensor and Button>

According to an embodiment, a pressure sensor and a button (not shown) may be included in the aerosol generating device 500. The pressure sensor may be positioned inside or outside the second end portion 530. The pressure sensor may sense whether a user inhales by measuring the pressure generated when the user brings the second end portion to the lips or bites the second end portion for smoking. According to an embodiment, the button may have a function for powering on/off the aerosol generating device 500 and may include an input function for storing a smoking pattern of the user. The button may include a function for determining whether it is an operation of a power function or an operation for storing a smoking pattern according to an input of the user. For example, the button may have a function for powering on/off in response to a long press or may have a function for storing a smoking pattern or a function for operating to transmit sensing information to change the type of smoke in response to a short press. However, the button of the present disclosure is not limited to the above functions.

According to an embodiment, when a user starts smoking, the aerosol generating device 500 may learn a smoking pattern using the pressure sensor and the button. The electronic device 310 may determine an expiration timepoint based on the learned smoking pattern and determine the volume and density of virtual smoke. The aerosol generating device 500 may transmit the smoking pattern (i.e., the sensing information) to the electronic device 310 through the dongle 330.

According to an embodiment, the operation of learning the smoking pattern using the pressure sensor and the button may include an operation of detecting a first time when the pressure value sensed by the pressure sensor is measured exceeding a first threshold value as the object is in contact with the second end portion 530 of the aerosol generating device 500, an operation of detecting a second time when the pressure value sensed by the pressure sensor is measured within a second threshold value as the object is separated from the second end portion 530 after the first time, and an operation of detecting a third time when the button of the aerosol generating device 500 operates after the second time.

According to an embodiment, in a method of learning a smoking pattern, when a user starts puffing to smoke, a timepoint at which the pressure changes may be measured and stored by the pressure sensor. Thereafter, a timepoint at which the value sensed by the pressure sensor at the timepoint the user ends puffing is restored may be stored. The time duration between the puff start timepoint and the puff end timepoint may be a smoke inhalation time of the user, which may be similar to an inspiration time of the user. Thereafter, when the user exhales the inhaled smoke, the user may press the button of the aerosol generating device 500 to input the start of expiration. When the expiration of the user ends, the user may terminate the input of the button. The time duration between the expiration start timepoint and the expiration end timepoint may be similar to an expiration time of the user. The aerosol generating device 500 may generate an algorithm for a smoking pattern of the user based on the smoking pattern of the user that has been performed at least one more time as described above, and may store a smoking pattern learned based on the algorithm.

According to an embodiment, the operation of storing the smoking pattern may include an operation of storing a smoking pattern based on an interval between the first time and the second time and between the second time and the third time and an operation of collecting data related to the smoking pattern with respect to at least one or more intervals between the first time and the second time and between the second time and the third time.

According to an embodiment, the operation of determining the expiration timepoint based on the learned smoking pattern by the electronic device 310 includes an operation of determining the expiration timepoint based on an interval between the first time and the second time. Hereinafter, the process of determining the expiration timepoint is the same as that using the capacitor sensor, and thus, a description thereof will be omitted.

According to an embodiment, the operation of determining the volume and density of virtual smoke based on the learned smoking pattern may include an operation of storing data about a comparison between the operation time of the pressure sensor and the operation time of the button and an operation of storing the volume and density of virtual smoke determined based on the data about the comparison, in the learned smoking pattern.

According to an embodiment, the volume and density of virtual smoke may vary according to the smoking pattern of the user. For example, if the expiration time of the user is shorter than the puff time of the user, the volume of virtual smoke may be increased so that thicker smoke may be output. If the puff time of the user detected by the pressure sensor is "2" seconds and it takes "1.5" seconds for the user to release the button after pressing it, the volume and density of virtual smoke may be determined so that more and thicker smoke may be emitted. That is, since the puff time of the user is the smoke inhalation time and the button operation time of the user is the expiration time, if the expiration time of the user is shorter than the smoke inhalation time of the user, then it may mean that the user exhaled the same amount of smoke for a short period of time. Thus, a larger amount of smoke should be implemented at a higher density for a short time in the electronic device 310.

<Camera Data and Pressure Sensor Data>

According to an embodiment, a pressure sensor may be included in the aerosol generating device 500. The pressure sensor may be positioned inside or outside the second end portion 530. The pressure sensor may measure pressure generated by the lips of a user to sense whether or not the user is inhaling.

Referring to FIGS. 3 and 5 together, according to an embodiment, when a user starts smoking, the electronic device 310 may receive camera data obtained by sensing a hand motion of a user from a camera (not shown). When the user holds the second end portion 530 in his or her mouth to smoke, the pressure sensor may obtain pressure sensor data. The electronic device 310 may predict an expiration timepoint based on the camera data and the pressure sensor data received through the dongle 330, that is, sensing information.

According to an embodiment, the electronic device 310 may install an application for monitoring the hand motion of the user, and accordingly, may sense smoking motion data of the user through the camera for monitoring the hand motion of the user. The camera may monitor a situation in which the user brings the aerosol generating device 500 to the mouth and inhales smoke into the lungs through inspiration, separates the aerosol generating device 500 from the mouth to exhale the smoke, and exhales the smoke. The data received from the camera and the application installed in the electronic device 310 may be used to analyze the hand motion of the user as described above to determine the inspiration volume and the expiration timepoint.

According to an embodiment, the electronic device 310, the camera, and the aerosol generating device 500 may operate as follows. The electronic device 310 in which the smoking device application is installed and the aerosol generating device 500 are connected using the dongle 330. When the user brings the aerosol generating device 500 to his or her mouth to smoke, the application in the electronic device 310 may analyze a hand motion of the user using an image (e.g., camera data) captured by the camera. When it is determined through the image captured by the camera that the aerosol generating device 500 reaches the mouth, and the pressure sensor operates (e.g., the measured pressure value is greater than or equal to a threshold value), it may be determined that the user starts smoking. For example, the aerosol generating device 500 may transmit the pressure value measured by the pressure sensor to the electronic device 310 through the dongle 330. After the user starts smoking, an action of the user of inhaling smoke into the lungs through inspiration, that is, an action of separating the aerosol generating device 500 from the mouth may be monitored using images captured by the camera. By analyzing an interval between the smoking start timepoint and the inspiration start timepoint, an intake volume and an inspiration volume may be estimated, and the timepoint of expiration may be determined based on the estimated intake volume and inspiration volume.

According to an embodiment, the operation of determining the expiration timepoint based on the monitoring result, that is, the sensing information, includes an operation of determining the expiration timepoint based on the interval between the first time and the second time. Hereinafter, the process of determining the expiration timepoint is the same as that using the capacitor sensor, and thus, a description thereof will be omitted.

Figure 6:
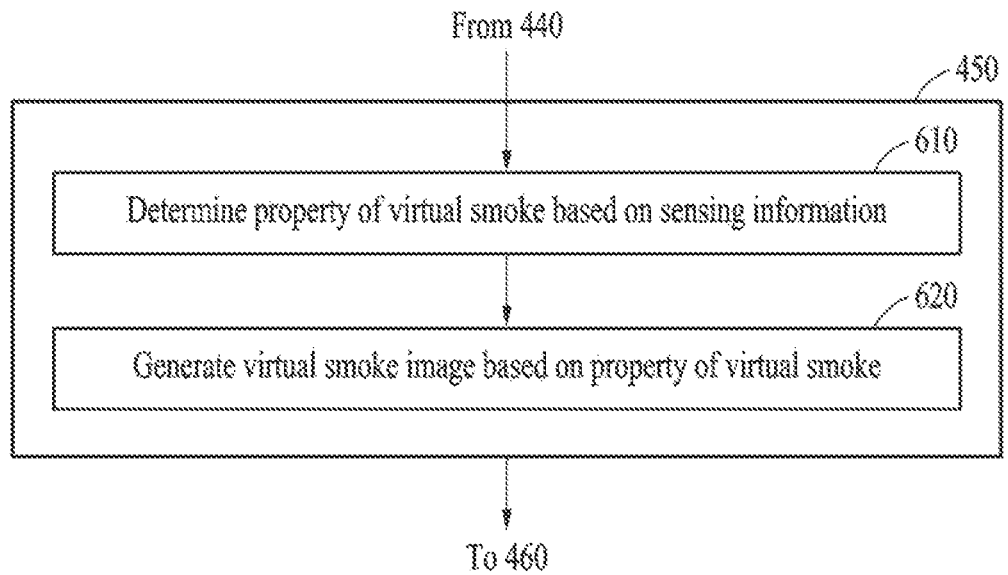
FIG. 6 is a flowchart illustrating a method of outputting a virtual smoke image according to an embodiment.

FIG. 6 is a flowchart illustrating a method of outputting a virtual smoke image according to an embodiment.

According to an embodiment, operation 450 described above with reference to FIG. 4 may include operations 610 and 620 described below.

In operation 610, the electronic device 310 may determine a property of virtual smoke based on sensing information received from the aerosol generating device 320 (or the aerosol generating device 120 of FIG. 1 or the aerosol generating device 500 of FIG. 5). For example, the property of the virtual smoke may include one or more of the size, shape, duration, volume, density, and color of the virtual smoke. Examples are not limited thereto in the present specification.

In an embodiment, the size, duration, volume, and density of the virtual smoke may be determined in proportion to a smoke inhalation time or an inspiration time based on the smoke inhalation time, wherein the smoke inhalation time may be predicted using one or more of information about the distance between the aerosol generating device 320 and an object (e.g., a body part of the user), information about a value sensed by a capacitor sensor of the aerosol generating device 320, coordinate change information of the aerosol generating device 320, monitoring information from a camera of the aerosol generating device 320, a smoking pattern learned using a pressure sensor and a button of the aerosol generating device 320, camera data, pressure sensor data, and button input information. For example, if the inspiration time is long, the duration of the virtual smoke may be determined to be equal to or proportional to the inspiration time.

In an embodiment, the shape of virtual smoke may be determined according to the monitoring information from the camera. When information obtained by monitoring a motion of an object, for example, the lips of the user, by the camera of the electronic device 310 is received, the monitoring information from the camera may include information related to the shape of the lips. For example, when the user purses the lips, the shape of virtual smoke may be determined to be thin and long.

In an embodiment, the volume, density, and color of virtual smoke may be determined according to the smoking pattern of the user. For example, if the expiration time of the user is shorter than the smoke inhalation time of the user, it may be determined to output thicker smoke by increasing the volume of virtual smoke, and the color of the virtual smoke may be determined to be a darker color.

In an embodiment, the electronic device 310 may directly receive a user input related to the property of the virtual smoke. For example, the color of the virtual smoke may be not only a general achromatic color but also various colors such as blue and purple according to the user input. As another example, the shape of the virtual smoke may be a donut shape.

In an embodiment, the sensing information on the state of the aerosol generating device 320 may be pressure sensor data, and may include airflow sensing information by the inspiration of the user. If the flow air pressure of the inside to which a pressure sensor of the aerosol generating device 320 is attached is high, the virtual smoke may be determined to be large and last for a long time even when the inspiration time is short.

In operation 620, the electronic device 310 may generate a virtual smoke image based on the property of the virtual smoke. In an embodiment, the virtual smoke image may be generated by additionally performing adjustments based on the property of the virtual smoke determined in operation 610 with respect to a preset basic property.

Figure 7:
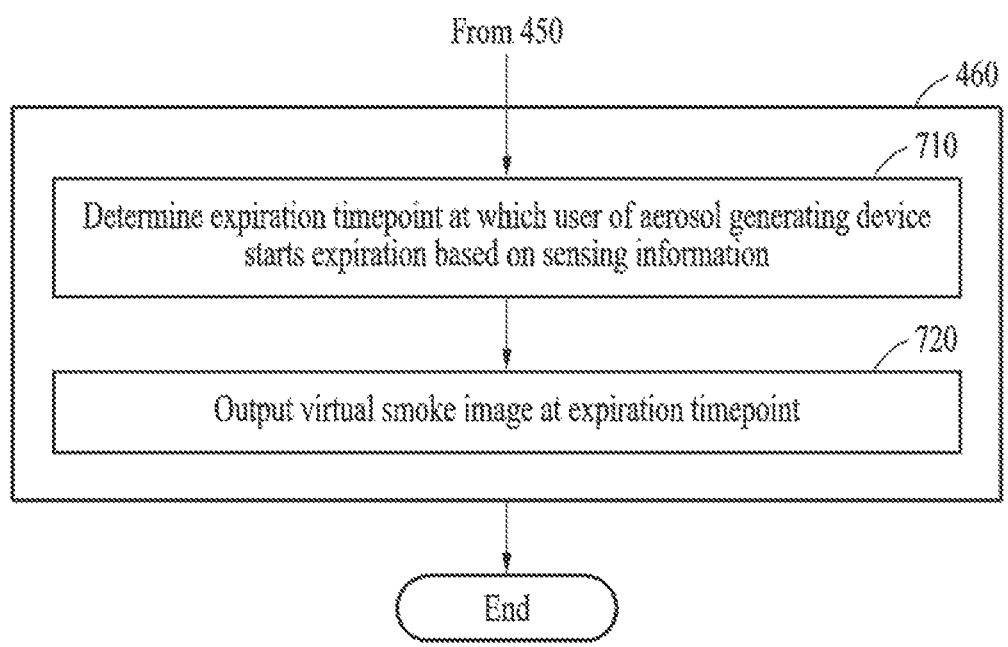
FIG. 7 is a flowchart illustrating a method of outputting a virtual smoke image according to an embodiment.

FIG. 7 is a flowchart illustrating a method of outputting a virtual smoke image according to an embodiment.

According to an embodiment, operation 460 described above with reference to FIG. 4 may include operations 710 and 720 described below.

In operation 710, the electronic device 310 determines an expiration timepoint at which a user of the aerosol generating device 320 starts expiration based on sensing information about a state of the aerosol generating device 320. The sensing information about the state of the aerosol generating device 320 may include one or more of information about the distance between the aerosol generating device 320 and an object (e.g., a body part of the user), information about a value sensed by a capacitor sensor of the aerosol generating device 320, coordinate change information of the aerosol generating device 320, monitoring information from a camera of the aerosol generating device 320, a smoking pattern learned using a pressure sensor and a button of the aerosol generating device 320, camera data, pressure sensor data, and button input information.

In operation 720, the electronic device 310 outputs a virtual smoke image at the expiration timepoint. In an embodiment, the virtual smoke image is output through the display of the electronic device 310.

In an embodiment, the electronic device 310 may output the virtual smoke image to be superimposed on a reference image (e.g., a game image) for an existing application being executed by the electronic device 310. For example, the electronic device 310 may output images to overlap each other using a layer for outputting the reference image and a virtual smoke image layer. The user may observe the overlapping images.

In an embodiment, the virtual smoke image may be output to be synthesized with a scene in the reference image content. For example, the image may be output so that virtual smoke appears in the scene in the reference image.

Even when smoke is not visually observed in reality, the user may observe smoke through an image in which virtual smoke appears and have a satisfactory feeling of smoking through the observed smoke.

The units described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method for outputting a virtual smoke image, performed by an electronic device, the method comprising:
   receiving a connection request from an aerosol generating device in a state of being paired with one or more external controllers;
   determining a controller type of the aerosol generating device;
   suspending pairing with a target external controller among the one or more external controllers when the determined controller type corresponds to a type of the target external controller and performing connection with the aerosol generating device;
   receiving sensing information about a state of the aerosol generating device;
   generating a virtual smoke image based on the sensing information; and
   outputting the virtual smoke image through a display of the electronic device.

2. The method of claim 1, wherein the outputting the virtual smoke image through the display of the electronic device comprises outputting the virtual smoke image to be superimposed on a reference image for an existing application being executed by the electronic device.

3. The method of claim 1, wherein the generating the virtual smoke image based on the sensing information comprises:
   determining a property of virtual smoke based on the sensing information, wherein the property of virtual smoke comprises at least one of a size, a shape, and a duration of the virtual smoke; and generating the virtual smoke image based on the property of the virtual smoke.

4. The method of claim 1, wherein the outputting the virtual smoke image through the display of the electronic device comprises:
 determining an expiration timepoint at which a user of the aerosol generating device starts expiration based on the sensing information; and
 outputting the virtual smoke image at the expiration timepoint.

5. The method of claim 4, wherein the determining the expiration timepoint at which the user of the aerosol generating device starts expiration based on the sensing information comprises determining the expiration timepoint based on a first time when a distance between one side of the aerosol generating device and a body part of the user, detected by the aerosol generating device, reaches within a first threshold value and a second time when the distance between the one side of the aerosol generating device and the body part of the user exceeds a second threshold value after the first time.

6. The method of claim 4, wherein the determining the expiration timepoint at which the user of the aerosol generating device starts expiration based on the sensing information comprises determining the expiration timepoint based on a change in capacitance of the aerosol generating device.

7. The method of claim 6, wherein the determining the expiration timepoint based on the change in capacitance of the aerosol generating device comprises determining the expiration timepoint based on a first time when a value of the capacitance of the aerosol generating device, sensed by the aerosol generating device, reaches within a first threshold value and a second time when the value of the capacitance of the aerosol generating device exceeds a second threshold value after the first time.

8. The method of claim 1, wherein the connection request is received through a dongle connected to the electronic device from the aerosol generating device establishing a wireless communication channel with the dongle.

9. The method of claim 1, wherein the connection request is received from the aerosol generating device directly establishing a wireless communication channel with the electronic device.

10. A non-transitory computer-readable storage medium storing a program, when executed by a processor, causing the processor to perform the method of claim 1.

11. An electronic apparatus comprising:
 a display;
 a memory configured to store a program for outputting a virtual smoke image; and
 a processor configured to execute the program,
 wherein the processor is further configured to perform:
 receiving a connection request from an aerosol generating device in a state of being paired with one or more external controllers;
 determining a controller type of the aerosol generating device;
 suspending pairing with a target external controller among the one or more external controllers when the determined controller type corresponds to a type of the target external controller and performing connection with the aerosol generating device;
 receiving sensing information about a state of the aerosol generating device;
 generating a virtual smoke image based on the sensing information; and
 outputting the virtual smoke image through a display of the electronic device.

* * * * *